No. 690,809. Patented Jan. 7, 1902.
G. T. WOODS.
APPARATUS FOR CONTROLLING ELECTRIC MOTORS OR OTHER ELECTRICAL TRANSLATING DEVICES.
(Application filed Mar. 28, 1901.)
(No Model.)
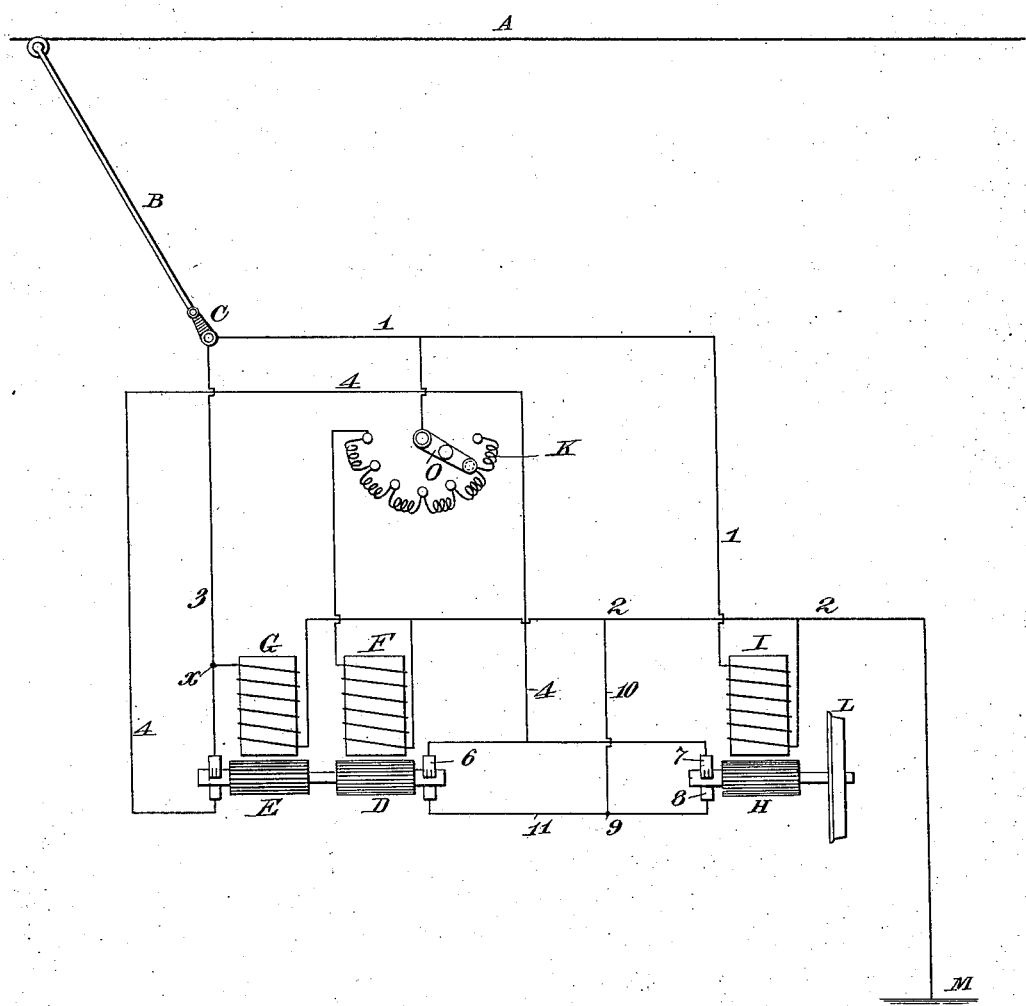
Witnesses:
Jas. F. Coleman
Archibald S. Reese
Inventor
Granville T. Woods
By Dyer Edmonds & Dyer
Att'ys.

UNITED STATES PATENT OFFICE.

GRANVILLE T. WOODS, OF NEW YORK, N. Y., ASSIGNOR TO H. WARD LEONARD, OF NEW YORK, N. Y.

APPARATUS FOR CONTROLLING ELECTRIC MOTORS OR OTHER ELECTRICAL TRANSLATING DEVICES.

SPECIFICATION forming part of Letters Patent No. 690,809, dated January 7, 1902.

Original application filed August 27, 1892, Serial No. 444,268. Divided and this application filed March 28, 1901. Serial No. 53,212. (No model.)

*To all whom it may concern:*

Be it known that I, GRANVILLE T. WOODS, a citizen of the United States, residing in the borough of Manhattan, city of New York, county and State of New York, have invented certain new and useful Improvements in Apparatus for Controlling Electric Motors or other Electrical Translating Devices, of which the following is a description.

The object of my invention is to provide for the efficient and economic regulation of electric motors without employing regulating-resistances in the manner in which they are now used.

The invention consists, first, in an improved method of controlling electric motors or other electrical translating devices by generating, exterior to the motor to be governed, an electromotive force counter to the current supplied to the motor from the main source and varying such counter electromotive force to control the supply of current from the main source to the motor; second, in the above method of operation supplemented by the further step of supplying to the motor to be governed an auxiliary current generated by means of the energy employed in developing said counter electromotive force, and, third, in an improved organization of apparatus for carrying out the invention.

The accompanying drawing is a diagram illustrating my invention in a simple and efficient form.

The invention is shown applied to a trolley system of electrical propulsion.

A indicates the conductor upon which the trolley B runs, and M indicates the other side of the circuit, in this instance shown as the earth.

C indicates a switch by which the circuit connection between the apparatus and the conductor A may be opened and closed at pleasure. Current from the main circuit passes by wire 1 around the field-magnet core I of the motor to be regulated, thence by wire 2 to earth. H is the armature of this motor and is fast on or otherwise geared or connected to the axle to be driven, L being one of the drive or carrying wheels mounted on the axle. Current also passes by wire 3 through the coil or coils of the field-magnet G of an auxiliary motor of which E is the armature and thence by wire 2 to earth. Current also passes from the conductor A through the switch O, movable over a series of resistances K, through the coil or coils of the field-magnet F of a dynamo-electric generator of which D is the armature and thence by wire 2 to earth. The wire 3 is connected from a point X between the conductor A and the coil of the field-magnet G with one brush of the armature E of said magnet, the other brush of which is connected by wire 4 with a brush 6 of the generator F D and a brush 7 of the motor I H to be controlled. The other brush 8 of said motor is connected by wire 11 with the remaining brush of the generator, and the two last-named brushes are connected from the point 9 by wires 10 and 2 to earth.

The operation of this apparatus is as follows: The fields of the main motor, the auxiliary motor, and the generator are energized by the current passing in the connections described, and the amount of current passing to the field-coil of the generator may be regulated by the manipulation of the switch O. The current from the conductor A reaches the armature H of the main motor after having traversed the armature of the auxiliary motor. In other words, these armatures are in series. The current developed in the armature of the generator also traverses the armature of the main motor, these two armatures being in series with each other in the local circuit 6 7 8 11, while in shunt with each other relative to the source. The apparatus will be running with the least expenditure of energy when the greatest resistance at O K is included in the circuit of the generator-field. As this resistance is cut down more current traverses said field and its magnetization is increased, or, in other words, the number of lines of force is increased. This requires more work from the auxiliary motor G E, and as a consequence its speed is reduced, the counter electromotive force in its armature-coils falls, and more current passes from the point X through the armature E, and consequently through wire 4 and armature H to earth. At the same time the current developed in the armature of the generator F D is increased, and this current also traverses the armature H. The generator is so wound and constructed as to develop a current of a higher electromotive force than the main current taken from the conductor A. The armature E is wound with a coarse wire to allow a large volume of current to pass through it without heating.

By this apparatus and method of operation I am enabled to dispense with ordinary resistance-regulators, which absorb a large amount of power and are for other reasons objectionable. The particular organization illustrated may of course be varied and the invention embodied in other forms of apparatus without departing from the principles thereof.

I do not claim herein the method involved in the operation of the apparatus herein described, since that feature of my invention forms the subject-matter of my original application, Serial No. 444,268, filed August 27, 1892, of which the present application is a division.

What I claim is—

1. The combination of a translating device, a source of supply for said translating device, and a regulating device producing by magnetic induction an electromotive force between the source and the translating device and whose electromotive force is variable, substantially as set forth.

2. The combination of a translating device, a source of supply for said translating device, a dynamo-electric machine located between the source and the translating device and whose electromotive force is variable, and means for varying the electromotive force of said dynamo to regulate said translating device, substantially as set forth.

3. The combination with a source of supply and a circuit extending therefrom, of an electric motor, and a regulating dynamo-electric machine connected in series with said motor across said circuit, said dynamo being adapted to produce an electromotive force variable independently of the electromotive force of said circuit, substantially as set forth.

4. The combination with an electric motor, of a counter-electromotive-force regulator consisting of a second dynamo-electric machine whose armature is in series with the armature of the motor to be regulated, and independent means for varying the counter electromotive force of said second dynamo-electric machine, substantially as set forth.

5. The combination with a source of electric energy, of a motor driven thereby, a translating device connected in series with the motor, and means whereby the mechanical energy of said motor is converted into electrical energy and used to supply said translating device, substantially as set forth.

6. The combination of a source of electric energy, a constantly-revolving motor connected therewith, a generator driven by said motor, and a motor supplied with energy from both the source and said generator, substantially as set forth.

7. The combination with a translating device, of two generators simultaneously supplying current thereto, one being operated by power derived from the other, substantially as set forth.

8. The combination with a source of constant electromotive force, of a motor driven thereby, a generator driven by said motor, and a motor whose armature is in series with both the source and said motor, substantially as set forth.

9. The combination of two generators located at distant points and supplying current to the same translating device, the electromotive force of the generators being different, substantially as set forth.

10. The combination of a source of electric energy, a circuit extending therefrom, and two electromotive-force-producing windings connected electrically therewith and mechanically connected together, one of said windings being connected in series with a translating device the electromotive force upon whose terminals is regulated by varying the electromotive force of said winding, substantially as set forth.

11. The combination of two moving electromotive-force-producing windings, both being electrically and mechanically connected together and the voltage upon the terminals of the two windings being normally different, and a translating device connected therewith, substantially as set forth.

12. The combination, substantially as set forth, of the main circuit, a main electric motor to be regulated and an auxiliary electric motor, the armatures of the two motors being connected in series, a generator driven by the auxiliary motor, circuit connections by which the current therefrom is supplied to the main motor, and means for varying the current traversing the field coil or coils of the generator.

13. The combination of a source of electric energy, a circuit extending therefrom, two dynamo-electric machines E and D electrically connected therewith and mechanically connected together, and a dynamo-electric machine H, the armatures of the machines D and H being connected in shunt relation relative to the source and in series with the armature of the machine E, said machine D being adapted to produce an electromotive force variable independently of the electromotive force upon the armature-terminals of the machine H, substantially as set forth.

14. The combination with a source of electric energy, of an electrically-propelled vehicle having three dynamo-electric machines, one of said machines being connected to the driving mechanism of the vehicle, the other two having their armatures mechanically connected together and rotating independently of the motion of the vehicle, substantially as set forth.

15. In a system of electrical distribution, the combination with the main source supplying electrical energy to translating devices, of a motor supplied with current therefrom, means for regulating the counter electromotive force of said motor to control the electrical energy delivered to the translating devices, said means consisting of an auxiliary generator of electric energy driven by said motor and means for varying the energy developed therein.

16. The combination with a main source of electric energy, of a working motor and a regulating dynamo-motor, the armature of the working motor being connected to the feed-circuit in series with the motor-armature of the dynamo-motor and in shunt with the dynamo-armature of the dynamo-motor, and means for controlling the current generated in the dynamo-armature of the dynamo-motor.

17. In a system of electrical transmission of power, the combination with a main source of electric energy and a circuit extending therefrom, of a local or distant closed loop connected therewith, there being in series in the closed loop two armatures, one being a generator-armature and one a motor-armature.

18. The combination with an electric motor, of a supply-circuit, means for connecting the motor with the supply-circuit, a converter in circuit with the motor and with the supply-circuit, and means for varying the relative values of the currents from the supply-circuit and converter-circuit.

19. The combination of a source of electric energy, a vehicle having an electrical propelling-motor mounted thereon, a rotary transformer of electric energy electrically connected with said source of electric energy and with said propelling-motor, and means on the vehicle for varying the voltage of the electric energy delivered by said transformer.

20. The combination of a source of electric energy, a vehicle having an electrical propelling-motor mounted thereon, a rotary transformer of electric energy carried by said vehicle and electrically connected with said source of electric energy and with said propelling-motor, and means on the vehicle for varying the voltage of the electric energy delivered by said transformer.

21. The combination of a source of electric energy, a circuit extending therefrom, a vehicle having an electrical propelling-motor mounted thereon, means on or forming part of the vehicle for making traveling contact with said circuit, a rotary transformer of electric energy electrically connected with said source of electric energy and with said propelling-motor, and means on the vehicle for varying the voltage of the electric energy delivered by said transformer.

22. The combination of a source of electric energy, a circuit extending therefrom, a vehicle having an electrical propelling-motor mounted thereon, means on or forming part of the vehicle for making traveling contact with said circuit, a rotary transformer of electric energy carried by said vehicle and electrically connected with said source of electric energy and with said propelling-motor, and means on the vehicle for varying the voltage of the electric energy delivered by said transformer.

23. The combination of a constant-potential supply-circuit, a motor operated therefrom, and a plurality of regulating dynamo-electric machines mechanically coupled together and connected across said circuit, the first-named motor being coupled between the regulating-machines so that its armature is in series with one of the regulating-machines and is shunted by a second machine.

This specification signed and witnessed this 27th day of March, 1901.

GRANVILLE T. WOODS.

Witnesses:
WILLIAM PELZER,
JNO. R. TAYLOR.